UNITED STATES PATENT OFFICE.

CHARLES L. PARSONS, OF DURHAM, NEW HAMPSHIRE.

PROCESS FOR THE PURIFYING OF URANIUM COMPOUNDS.

1,224,014.     Specification of Letters Patent.     Patented Apr. 24, 1917.

No Drawing.     Application filed May 19, 1915. Serial No. 29,211.

(DEDICATED TO THE PUBLIC.)

*To all whom it may concern:*

Be it known that I, CHARLES L. PARSONS, a resident of Durham, in the county of Strafford and the State of New Hampshire, have invented a new and useful Process for the Purifying of Uranium Compounds, of which the following is the specification.

This application is made under the act of March 3, 1883, chapter 143 (22 Stat. L., 625), and the invention herein described and claimed may be used by the Government of the United States, or by any of its officers or employees in the prosecution of work for the Government, or by any person in the United States, without payment of any royalty thereon.

The object of my invention is to prepare oxides of uranium from uranium compounds, such as the uranates.

With the foregoing object in view, the invention resides in the combination and details of treatment hereinafter described and claimed, it being understood that changes in the fluxes and solvents, and the proportions thereof, and in minor details, may be made within the scope of the claims without departing from the spirit or sacrificing any of the advantages of the invention.

In carrying out my invention in its preferable form, I proceed substantially as follows:

My process consists in fusing the uranium compound, for example sodium uranate ($Na_2U_2O_7$), with an equal weight of a flux, preferably sodium chlorid (in the form of common salt) or the like. The addition of 2 per cent. of an alkaline hydroxid facilitates the process. The mass is then cooled and the soluble matter dissolved therefrom by any suitable solvent, such, for example, as water. The residue, consisting of the uranate is then well washed with the solvent used, and water if desired. The mass is then dried.

It is realized that fluxes have been used heretofore for the treatment of ores containing uranium compounds, but this invention is directed to the treatment of uranium compounds to purify them from associated impurities and not, as in the processes referred to, to separate the uranium from gangue and large proportions of other associates in the ore.

I claim:

1. The process of purifying uranium compounds, which consists in fusing the same with a flux incapable of forming a soluble compound with the uranium and then dissolving out the soluble matter from the uranium compound.

2. The process of purifying uranates from vanadium and the like, consisting in fusing the uranate with a flux incapable of forming a soluble compound with the uranium, dissolving out the soluble matter and washing the residue.

3. The process of purifying an alkaline metal uranate, consisting in fusing the same with an alkali metal salt incapable of forming a soluble compound with uranium, dissolving out the soluble matter in water, and washing the residue.

4. The process of purifying an alkali metal uranate, consisting in fusing the same with an alkali metal chlorid, and washing the resulting mass.

5. The process of purifying uranium compounds, which consists in fusing the same with a flux and separating the impurities from the mass.

6. In the process of purifying a uranate the step of fusing the same with an alkali metal chlorid.

7. In the process of purifying a uranate the step of fusing the same with sodium chlorid.

CHARLES L. PARSONS.